United States Patent [19]

Hesse

[11] Patent Number: 5,095,425
[45] Date of Patent: Mar. 10, 1992

[54] METHOD AND ARRANGEMENT FOR DATA TRANSMISSION, AS WELL AS A STATION TO IMPLEMENT THE METHOD HAVING TIMING PERIODS BEGINNING ON SUCCESSIVE TRANSITIONS OF DATA SIGNAL

[75] Inventor: Feodor W. Hesse, Schenefeld, Fed. Rep. of Germany

[73] Assignee: U.S. Philip Corp., New York, N.Y.

[21] Appl. No.: 590,433

[22] Filed: Sep. 27, 1990

Related U.S. Application Data

[63] Continuation of Ser. No. 489,768, Feb. 26, 1990, abandoned, which is a continuation of Ser. No. 217,102, Jul. 8, 1988, abandoned, which is a continuation of Ser. No. 96,304, Sep. 7, 1987, abandoned, which is a continuation of Ser. No. 690,062, Jan. 9, 1985, abandoned.

[30] Foreign Application Priority Data

Jan. 21, 1984 [DE] Fed. Rep. of Germany ....... 3402076

[51] Int. Cl.$^5$ .................. G06F 13/36; G06F 13/42
[52] U.S. Cl. ................. 395/350; 364/242.95; 364/240.8; 364/284.3; 364/DIG. 7
[58] Field of Search .......... 340/825.5, 825.05; 379/86; 364/200 MS File, 900 MS File

[56] References Cited

U.S. PATENT DOCUMENTS

| 4,199,661 | 4/1980 | White et al. | 340/825.5 |
|---|---|---|---|
| 4,232,294 | 11/1980 | Burke | 340/825.5 |
| 4,335,426 | 6/1982 | Maxwell | 340/825.05 |
| 4,383,315 | 5/1983 | Torng | 340/825.05 |
| 4,395,710 | 7/1983 | Einolf | 340/825.5 |
| 4,408,272 | 10/1983 | Walters | 364/200 |
| 4,418,386 | 11/1908 | Vielink | 364/200 |
| 4,429,384 | 1/1984 | Kaplinsky | 370/85 |
| 4,472,711 | 9/1984 | Stollberger | 340/825.05 |
| 4,504,945 | 3/1985 | Kunikyo | 340/825.05 |
| 4,511,967 | 4/1985 | Witalka et al. | 364/200 |
| 4,570,162 | 2/1986 | Boulton | 340/825.5 |
| 4,611,274 | 9/1986 | Machino | 364/200 |

OTHER PUBLICATIONS

"*Data and Communications*", by William Stallings.

*Primary Examiner*—Lawrence E. Anderson
*Attorney, Agent, or Firm*—Jack D. Slobod

[57] ABSTRACT

For data transmission via a data bus in the form of a single-wire bus, to which several stations are connected in parallel, data bits are transmitted singly in a periodic sequence of signals, whereby each period has at least one section in which the transmitted signal indicates the occupancy of the data bus, a further section in which the transmitted signal indicates the value of the data bit, and a section without data, preferably with high potential in the case of an electric data bus, to which the data generated by the individual stations is linked by an OR function. The durations of the individual sections have fixed periods with respect to one another, and from the signal transfer at the beginning of every two successive periods the duration of the period in each station is determined and from the the position of the individual sections is determined in which the signal is sampled on the data bus and the value of the transmitted data bit is determined. In a preferred embodiment, at the beginning of each period a signal transfer is created on the data bus permanently, outside of a data transmission, so that a first section of the period represents a permanent clock pulse on the data bus which synchronizes all the stations. For the signal which indicates the occupancy of the data bus a section is reserved after this which is then followed again by the time period for the data bit. This makes it possible to achieve a data transmission between stations the internal clocks of which exhibit considerable differences, and yet multimaster operation is still possible.

14 Claims, 7 Drawing Sheets

METHOD AND ARRANGEMENT FOR DATA TRANSMISSION, AS WELL AS A STATION TO IMPLEMENT THE METHOD HAVING TIMING PERIODS BEGINNING ON SUCCESSIVE TRANSITIONS OF DATA SIGNAL

This is a continuation of application Ser. No. 489,768, filed on Feb. 26, 1990 which is a continuation of Ser. No. 217,102, filed on July 8, 1988 which is a continuation of Ser. No. 096,304, filed on Sept. 8, 1987 which is a continuation of Ser. No. 690,062, filed on Jan. 9, 1985, all of which have been abandoned.

BACKGROUND OF THE INVENTION

The invention relates to a method for the transmission of data from one station to another by way of a data bus to which several stations are connected in parallel such that signals emitted by all the stations are linked to the data bus via an OR function in which all the stations receive the signals present on the data bus and at least some stations independently of one another access the data bus for a data transmission when data to be transmitted are present and the signal present on the data bus corresponds to the logic value "0" for a specified time period. For a data transmission a signal corresponding to the logic value "1", which identifies the condition of the data bus as "occupied", is transmitted periodically during a specified initial part period. A signal which corresponds to the value of the data bit to be transmitted is then transmitted during a specified second part period and then a signal corresponding to the logic value "0" on the data bus is transmitted during a specified third part period.

Such a method is known from U.S. Pat. No. 4,418,386, and uses a transmission medium which can transmit at least two logic states, for example a twisted pair of wires or a coaxial cable or also, for example, a glass fiber connection. This enables a data transmission system to be accomplished particularly inexpensively. However, in the case where several stations access the bus at the same time, which station finally retains the access to the bus must be resolved. This problem can be solved more easily if several parallel transmission lines are used for the data bus, but this then means higher expenditure for the connection which is also undesirable.

In the arrangement as described in the above-mentioned U.S. Pat. No. 4,418,386, stations which are ready to transmit wait for an initial period of time after the end of the last operation on the data bus to see whether the bus remains in the quiescent state, and if this is the case, a character is transmitted via the bus after a second period of time. This is achieved by the fact that after expiration of the second time interval a transmitting station brings the logic value "1" to the bus after it previously had the logic value "0" in the quiescent state. A certain time after this, a data character is transmitted and then the data bus returns to the quiescent state, in which case the transmitting station, or stations, monitors the state of the data bus again for a given time. All times or time intervals are dependent in this case on the internal clock generators of the respective stations which can exhibit relatively large scatters in their frequency. In order to obtain unambiguous states particularly in the case of simultaneous access by several stations, the individual times must, on account of these tolerances, obey certain conditions as pointed out in U.S. Pat. No. 4,418,386. This leads to troublesome and time-consuming control in the individual stations which therefore is also expensive.

U.S. Pat. No. 4,429,384 also describes a method and an arrangement in which the data is also transmitted via an individual transmission circuit, such as, for example, a twisted pair of wires or a glass fiber section. The transmission takes place in blocks, in which case a block is preceded by a start bit during which the data bus is brought to the logic value "1". The logic values of the data bits are represented in this case by different durations of a given signal state on the data bus, in contrast to the first-named arrangement as described in U.S. Pat. No. 4,418,386 in which the logic value of a bit is determined by the signal value itself on the data bus. In the case of the arrangement as described in U.S. Pat. No. 4,429,384 it is also necessary that the frequencies of the clock generators in the individual stations are defined within certain limits, in which situation several classes of frequencies are also possible for the clock generators. Then, however, at the beginning of a data transmission the transmitting station has to ascertain first of all to which class of clock frequencies the called station belongs. This transmission method, too, is cumbersome and relatively expensive.

It is the aim of the invention to outline a method of the type mentioned in the preamble which at low expense makes it possible to transmit data between stations with considerable clock frequency differences, without the clock frequency of the called station being known in the transmitting station at the start of a transmission. The invention achieves this aim by transmitting signals during three partial periods whose durations have a fixed relationship one to the other. In all stations the length of the entire period and hence the position of the partial periods within it is determined from the signal transfers on the data bus at the beginning of two successive first part periods and the state of the data bus is determined from the signal on the data bus during the first partial period and the logic value of the transmitted data bit is determined during the second part period.

Because of the fixed relationships between the part periods and because of the joining together without a pause and especially because in all stations the lengths or positions of the part periods are automatically determined practically independently of clock generators inside the stations, there are no synchronization problems. The part periods can be determined from the signal on the data bus by simple means, as is shown later. This creates a very inexpensive data transmission method which can also be profitably used in simple applications.

It is advantageous that the information on the data bus directly indicates whether the data bus is occupied because this occupancy information is uniquely allocated to a certain point within the period. This means that waiting times and special control sequences are not necessary or are very simple. In order that the length of the entire period for a data transmission can be simply measured at the beginning of a data transmission it is advisable, according to one embodiment of the invention, that at least one period without transmission of a bit should be included before the beginning of a data transmission. Because in this case the transmitting station generates a definite signal for occupancy of the data bus each time at the start of the first part period, the length of the transmission period can be determined from the first two successive signals of this kind, and is thus fixed at the beginning of the second period and can be used to evaluate data information in the second part period. This is based on the fact that at the end of a transmission the data bus constantly carries a signal corresponding to the logic value "0" until a station begins a renewed transmission.

Another possibility consists in also maintaining the synchronization during the transmission pauses. In one embodiment of the invention this is achieved by subdividing the first part period into two sub-periods. During the first sub-period a signal corresponding to the logic value "1" is always transmitted on the data bus even outside of a data transmission while during the second sub-period a signal corresponding to the logic value "1" is transmitted via the data bus only during a data transmission. A station that is ready to transmit accesses the data bus only when the signal on the data bus in the second sub-period corresponds to the logic value "0". In this case, therefore, the first part period is subdivided into two regions the first of which is used for synchronization and the second for occupation of the bus. The generation of the signal corresponding to the logic value "1" on the data bus may permanently come from one of the stations which, for example, is available only for the transmission of this signal within the first sub-period, or the stations alternate in that after completion of a data transmission in the first sub-period each station continues to transmit a signal corresponding to the logic value "1" until another station occupies the bus and thus takes over the synchronization. In this case this new accessing station can continue to operate with the same period length in accordance with the preceding constant synchronization, but it can also generate a new period length. In the latter situation, of course, it is advisable once again to insert at least one period without transmission of a bit before the start of a data transmission.

A particularly suitable choice of the lengths of the part periods or the sub-periods is for the second and the third part periods or the sub-periods to have the same durations of ¼ of the period in each case. Such a ratio is particularly easy to implement. To obtain the most trouble-free evaluation of the information transmitted via the data bus it is expedient that the status of the data bus and the logic value of the transmitted bit should be determined in each case approximately in the middle of the part period or sub-period concerned. Such determination or sampling times are also very easy to implement.

In many cases a transmitting station calls another station to collect information from the latter and transfer it to the transmitting station. For this, the desired other station can be addressed by the transmitting station through the data transmission and the transfer wish communicated. After this the initially transmitting station terminates the data transmission, and as soon as the data bus is signalled as being unoccupied, the previously addressed station begins the data transmission. In a further embodiment of the invention, however, there is also a simpler possibility as follows: even if, in the first part period of the second sub-period, a signal corresponding to the logic value "1" is transmitted by a first station via the data bus, a second station addressed by data sent from this first station transmits via the data bus, during the second part period of at least one period, a signal corresponding to the logic value of a data bit to be transmitted, and the first station during the second part period of this period feeds a signal corresponding to the logic value "0" to the data bus. It this way it is easy to conduct a dialogue between two stations.

Embodiments of a station for implementation of the invention method are also described.

BRIEF DESCRIPTION OF THE DRAWINGS

Embodiment examples of the invention are explained in greater detail below with the aid of the drawings which show FIG. 1 the connection of a number of stations to a data bus in the form of a ring.

DESCRIPTION OF THE PREFERRED EMBODIMENTS

Figure 1:
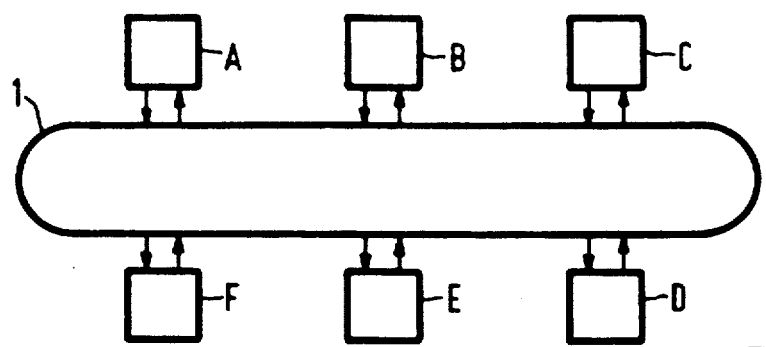

FIG. 1 shows six stations A to F represented symbolically as blocks. Both the output and the input of each of these stations A to F is connected to a data bus 1 which is shown here as a closed loop. The use of an open loop is just as possible however, and a star-shaped structure can also be used. The data bus 1 may comprise, for example, a coaxial cable or a twisted pair of wires, but it may also be in the form of a glass fiber connection for the transmission of optical signals. In the latter case, however, such a glass fiber connection is frequently interrupted in each station and leads there on the reception side to a light receiver which controls a light transmitter on the output side, the latter transmitting both the light signals received and the signals generated in the station concerned.

Figure 2:
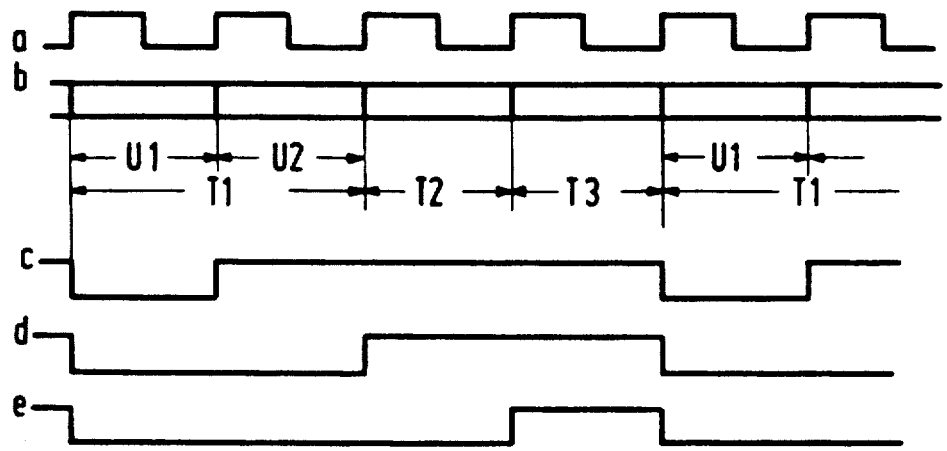
FIG. 2 signal waveforms on the data bus in the case of different operating states.

The waveforms of the signals on the data bus for different operating states are shown in FIG. 2. Line a shows a clock signal inside the station, which is explained in more detail with the aid of FIG. 3. Line b presents a survey of the individual part periods of a total period. Each total period embraces the part periods T1, T2 and T3, and after the end of the third part period T3 the first part period T1 of the next total period begins immediately. In the example shown the durations of the second and third part periods T2 and T3 each amount to a quarter of the total period so that the first part period T1 takes up half a total period. Other numerical ratios are also possible, but the ratios of the durations of the part periods as shown are easy to implement in practice as will be explained later.

In the example of FIG. 2, the first part period T1 is subdivided into two sub-periods U1 and U2. Both are of the same length here and thus amount to a quarter of the total period, the same as the second and third part periods T2 and T3. This choice of durations for the sub-periods U1 and U2 is also made solely on the basis of ease of technical implementation, whereas other numerical ratios are also possible.

The general situation of the signals on the data bus during a data transmission is illustrated in lines d and e. Here, therefore, during the first part period T1 there is a low signal on the data bus, in which case it is assumed that with an electric cable as the data bus a ground-connected transistor with open collector is provided on the output side in each station while at a single point a load resistor is connected against a positive operating voltage. In the case of a glass fiber connection the lower state of the line means that a light signal is being transmitted, while in the upper state of the line no light signal is present. Thus a wired OR-function is achieved in which a low signal indicates the value "1".

The low state of the lines in lines d and e during the first part period T1 means that a data transmission is taking place and the bus is thus occupied. This is immediately recognizable by all the stations connected to the data bus. The state of the lines in lines d and e of FIG. 2 differes only during the second part period T2 in which the value of the transmitted data bit is indicated. For example, with a signal waveform as in line d, a data bit with the logic value "0" is being transmitted and with the signal waveform of line e a data bit with the logic value "1". During the part period T3 there is a high signal on the data bus here in every case.

When the signal is received on data bus 1, all the connected stations determine from the negative signal edge at the beginning of the first part period T1 of two successive total periods the duration of the total period and thus the position of part period T2 from the given ratio of the individual part periods to one another. In the example shown, therefore, the second part period T2 begins half a determined total period after the negative signal edge of the data bus. Inside a further quarter of the total period the signal on the data bus can then be evaluated to determine the value of the transmitted data bit.

If no data transmission takes place, the signal on the data bus may be permanently high. The start of a new data transmission is then obtained from the first negative edge of the signal on the data bus. If this is taking place from a different station from that of the preceding data transmission, as will generally be the case, the duration of the total period can vary depending on the clock frequency inside the station. This can easily be taken into consideration, as is explained later.

Another possibility is to transmit an alternating signal, such as that shown in line c of FIG. 2, in addition to a data transmission on the data bus. Here, therefore, a low signal is produced on the data bus during the first sub-period U1 so that all the stations are constantly allocated a definite duration of the total period and thus all the stations are constantly synchronized. This signal can be generated by a certain station, for example station A in FIG. 1, or each station which has transmitted data then sends a signal like that of line c in FIG. 2 on the data bus until another station begins a data transmission. The start of a data transmission is identified by the fact that a low signal is now generated on the data bus during the second sub-period U2 so that a signal waveform like that of lines d or e in FIG. 2 is produced, depending on the value of the transmitted data bit. In this case, therefore, the signal state on the data bus during the second sub-period U2 indicates the state of the data bus, i.e. whether it is free or occupied for a data transmission. Because, before a data transmission, i.e. in the quiescent state, all stations receive a signal on the data bus corresponding to that of line e in FIG. 2, a station which begins a data transmission can perform this with the same or at least essentially the same period length which was fixed by the preceding signal on the data bus.

The transmission of a synchronized signal via the data bus, in addition to a data transmission, is particularly favorable when allowance has to be made for the fact that several stations can access the data bus simultaneously and the decision as to which station finally retains the access is made in a known manner during the transmission because then the data bits of all the stations are simultaneously present on the data bus and a data bit with the logic value "0" from a first station is masked by a data bit with the logic value "1" from a second station, and this identifies the first station and terminates the access to the data bus.

DESCRIPTION OF A TRANSMITTER-END SEQUENCE CONTROL

Figure 3:
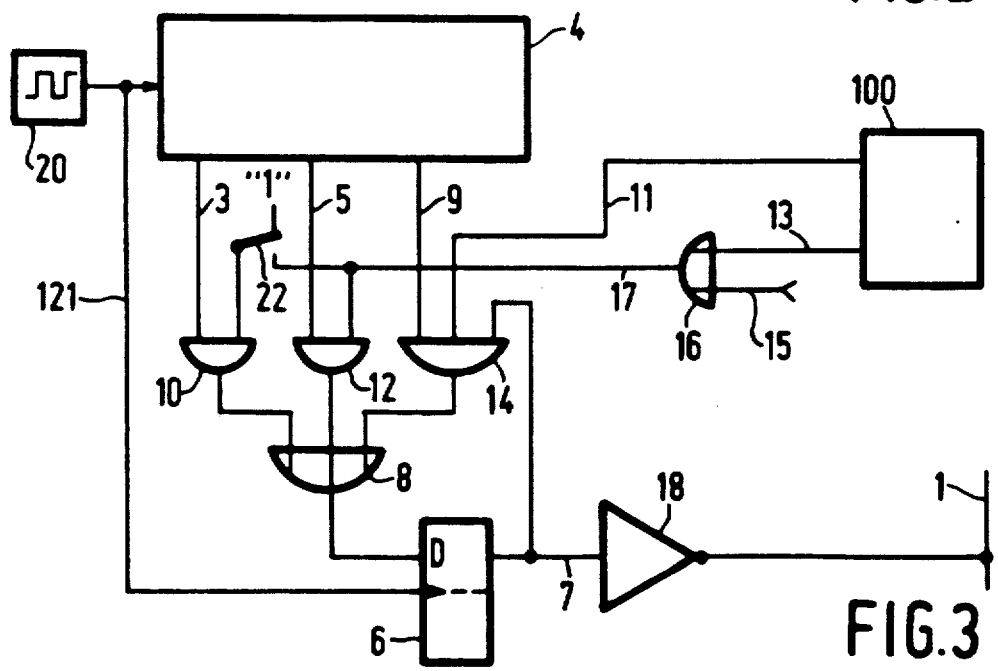
FIG. 3 a send-side sequence control in a station.

A possible arrangement which can generate the signals illustrated in lines c to d of FIG. 2 and which can represent a part of stations A to F in FIG. 1, is shown in FIG. 3. A clock generator 20, which generates the processing clock pulse in the station concerned, supplies on line 121' a clock signal which corresponds to the signal waveform in line a of FIG. 2 and which, preferably, is derived from a higher-frequency clock signal by division. This clock signal on line 121' is fed, in addition to a D-flip-flop 6, which is described subsequently, to a sequence control 4 which in the simplest case comprises a binary counter. This sequence control 4 successively produces at the outputs 3, 5 and 9 a send-control signal decoded from the counter reading,—at output 3 during the first sub-period U1, at output 5 during the second sub-period U2 and at output 9 during the second part period T2. The signals follow one another immediately and alternate in each case, for example, with the leading edge of the clock signal on line 121', as illustrated in FIG. 2. With the next leading edge of the clock signal on line 121' after the signal at the output 9 during part period T2, a signal does not appear at any of the outputs during a clock period; this corresponds to the part period T3, and with the following leading edge of the clock signal, a signal appears again at output 3, etc.

Each of the outputs 3, 5 and 9 is connected to the one input of a corresponding AND element 10, 12 and 14 respectively, the outputs of which are combined via the OR element 8 and fed to the D-input of the D-flip-flop 6. The other input of the AND element 10 is connected to a switch 22 which can connect this input either to a constant signal corresponding to the logic value "1" or to the line 17 which, moreover, is permanently connected to the other input of AND element 12. The signal on line 17 is generated by an OR element 16 either when a signal which is generated, for example, by the arrangement shown in FIG. 4 appears on line 15 or when a signal which is generated by processing device 100 (not shown in detail) appears on line 13. This processing device 100 contains, for example, measuring equipment for a quantity being measured and a converter which converts the measuring signal into a digital value and delivers it bit-serially over the length 11. This line 11 which, therefore, carries the data signal to be transmitted is connected to a second input of the AND element 14 the third input of which is connected to the output 7 of the D-flip-flop 6. This output 7, moreover, is coupled to data bus 1 via an inverting amplifier 18 which is constructed in such a way that at least in the first two part periods it forms an inclusive-OR operation of the signals generated by it with the signals present on the data bus and which, in the simplest case, consists of a transistor in basic emitter circuit with open collector, connected to the data bus 1.

The function of the arrangement illustrated in FIG. 3 is as follows. If it is assumed first of all that no data is to be transmitted from the station in which this arrangement is present, then a signal corresponding to the logic value "0" is present both on line 13 and on line 15 and therefore on line 17, so that the AND element 12 is blocked. If, furthermore, the switch 22 is in the position as shown, the AND element 10 is permanently unblocked and passes on the signal, which appears at the output 3 of the sequence control 4 during the first sub-period U1, via the OR element 8 to the D-input of the D-flip-flop 6. Because this D-flip-flop 6 is edge-controlled at the clock input, it takes over the signal present at the D-output on each occasion with the next leading edge of the clock signal on the line 121 to the output 7 so that finally a signal appears on data bus 1 like that illustrated in line c of FIG. 2, except that it is displaced in fact with respect to line b by a phase of the clock signal illustrated in line a; this, however, is not important for the further function so that the illustration in FIG. 2 continues to form the basis. When, however, switch 22 is in the lower position and connects the other input of the AND element 10 to the line 17, all AND elements 10, 12 and 14 are blocked except for a data transmission from the relevant station, and the signal present on the data bus is constantly high and a low signal generated from another station is not influenced by this station. This low state can be assumed when the station has detected that another station is becoming a send operation. It is also possible that the upper state applies to one station and the lower state to all the others.

To prepare for a data transmission, a signal corresponding to the logic value "1" is generated on line 17, and in fact by a corresponding signal on line 13 by the processing unit 100 when the latter is called up, for example, for a data transmission in conversational mode by signals transmitted by another station. In this case, therefore, the data bus is still occupied by this other station, and during the second part period of one or more successive total periods this other station transmits a signal corresponding to the logic value "0" so that it can recognize the logic values of the data bits transmitted by the arrangement described here. The control processes required for this are not explained separately in detail here because they are not essential for the invention. Normally, an appropriate signal is generated on line 15 by the arrangement of FIG. 4 when the bus is unoccupied and data for transmission are present. For the rest this control may also be taken over by the processing unit 100 which means that there will then be no OR element 16 in the arrangement according to FIG. 3 and the line 13 is connected directly to line 17.

In the case of a signal corresponding to the logic value "1" on line 17 both the AND element 10 and the AND element 12 are unblocked irrespective of the position of switch 22 so that the signals at the outputs 3 and 5 of the sequence control 4 are fed during both sub-periods U1 and U2 to the D-input of the D-flip-flop 6 so that signals corresponding to line d or line e in FIG. 2 are generated on the data bus 1, depending on the data to be transmitted which is fed to AND element 14 via line 11. If a datum with the logic value "0" is to be transmitted, AND element 14 is blocked and the D-flip-flop 6 generates a high signal at output 7 only during two successive clock phases of the clock signal on line 121 so that a signal corresponding to line d in FIG. 2 appears on data bus 1. If, however, the signal on data line 11 is high, the signals at all three outputs 3, 5 and 9 are fed to the D-input of the D-flip-flop 6 because when the signal appears at output 9 the flip-flop 6 is still set and thus the righthand input of AND element 14 is also released. As a result, a low signal corresponding to line e in FIG. 2 appears on data bus 1 during three successive clock phases. The righthand input of the AND element 14 could also be connected to line 17, but the connection as shown has the advantage that the high signal on line 17 can already disappear after the end of the signal at output 5, i.e. already after the second sub-period U2, and it is still guaranteed that a valid datum is transmitted during the subsequent part period T2.

DESCRIPTION OF AN ARRANGEMENT FOR THE EVALUATION OF THE DATA BUS SIGNAL

Figure 4:
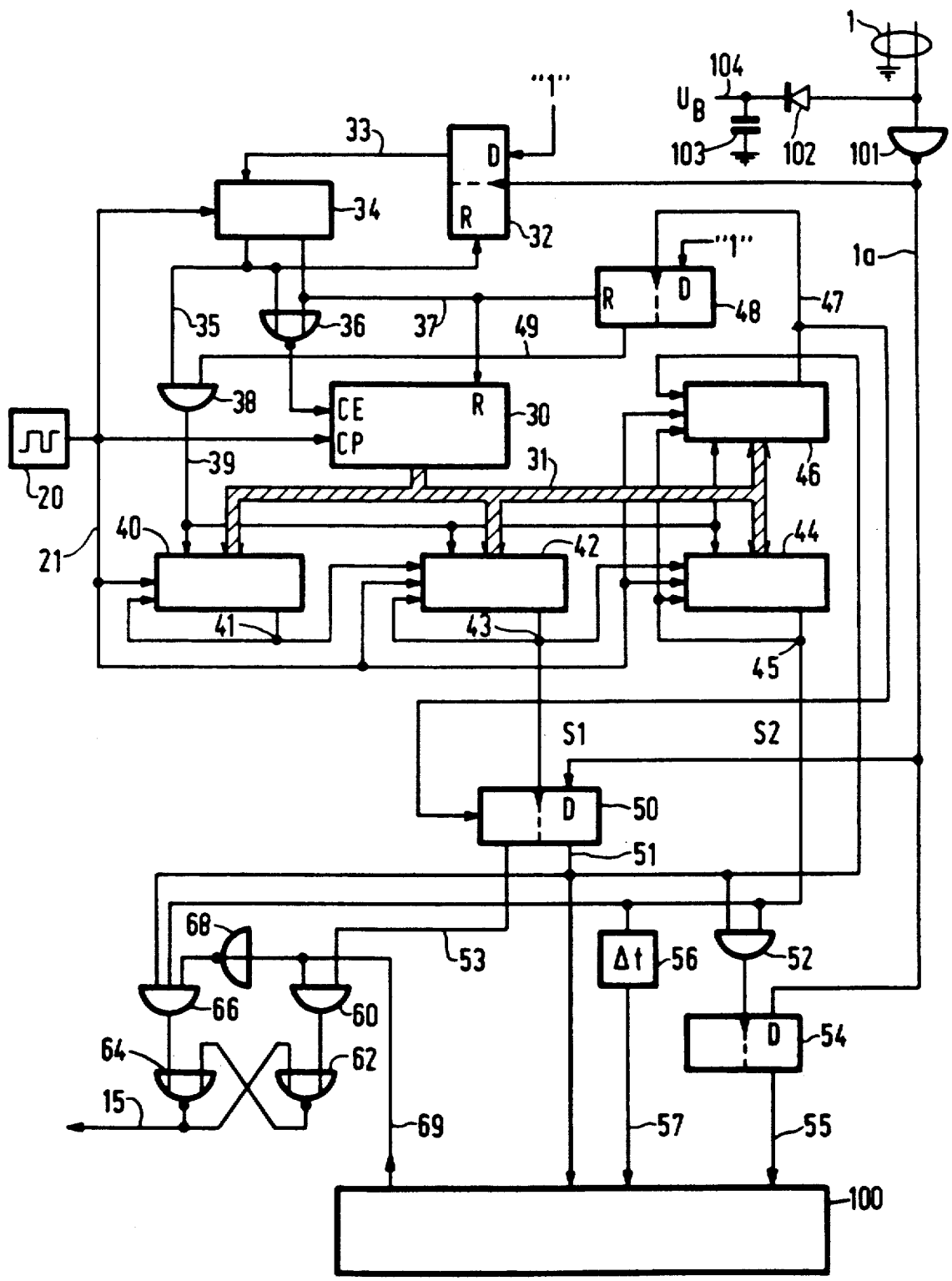
FIG. 4 an arrangement for the evaluation of the signal on the data bus in a station.

In the arrangement illustrated in FIG. 4 for the reception and evaluation of the signals on data bus 1 it is assumed that data bus 1 comprises an electrical connection, e.g. a twisted pair of wires or a coaxial line which contains therefore a reference conductor and a signal conductor. The reference conductor is connected to the reference point of the arrangement as in FIG. 4, and the signal conductor leads via a rectifier 102 to a high-capacitance charging capacitor 103. From this connection 104 with the charging capacitor 103 is tapped the operating voltage $U_B$ for the electronic parts of the station of which the arrangement shown in FIG. 4 forms a part. In this way this station does not then need its own power supply.

The signal conductor of data bus 1 further leads to an inverting amplifier 101 which is suitably provided with a defined switching threshold and at the output 1a supplies a defined binary signal with steep transitions irrespective of the shape of the signal on data bus 1.

The inverted data bus signal on line 1a which has a positive signal edge at the beginning of every new period of the signals on data bus 1 leads to the clock input of an edge-controlled D-flip-flop 32, the D-input of which is permanently connected to a signal corresponding to the logic value "1". If, therefore, a positive edge occurs on line 1a, the D-flip-flop 32 is set and then supplies on the output line 33 a signal corresponding to the logic value "1". These processes are illustrated in more detail in FIG. 5a.

Line 33 leads to the data input of a two-stage shift register 34 which receives at the clock input a clock signal generated by clock generator 20 on line 21 the frequency of which is higher than that of the clock signal on line 121 in FIG. 3. With the first positive edge of this clock signal the value "1" present on line 33 is transferred into shift register 34, and a positive signal appears on the output line 35. This resets the D-flip-flop 32. Furthermore, the line 35 leads via the NOR element 36 to the enable input CE of a counter 30, which is described subsequently, and blocks its counting operation. In addition, line 35 leads to one input of an AND element 38 the other input of which is connected to the line 49 from the D-flip-flop 48 and receives first of all a logic "0".

With the leading edge of the next clock signal on line 21 the logic "1" is further shifted in the shift register 34 so that a signal corresponding to the logic value "1" appears on line 37. This resets the counter 30 via reset input R to a defined initial position or zero position as the case may be and also resets the D-flip-flop 48 so that line 49 now carries a "1", but line 35 already has a "0" again. In addition, line 37 also leads via the NOR element 36 to the blocking input CE of counter 30 and keeps the latter blocked. With the next leading edge of the clock signal on line 21 the logic "1" on line 37 then also disappears so that now counter 30 is released to count up from the initial position with the clock pulse on line 21. There now passes a relatively long time with respect to the operations illustrated on the left in FIG. 5a before the signal on data bus 1 becomes positive again, which however does not trigger any further operations. After a further relatively long time a negative edge appears then again in the signal on data bus 1 which again is asynchronous to the clock signal on line 21, i.e. can occur again at any point between two positive edges of this signal. The D-flip-flop 32 is again set with this edge of the signal on data bus 1, and with the next positive edge of clock signal 21 a positive signal again appears on line 35, but which this time thanks to the also positive signal on line 49 generates via the AND element 38 a corresponding signal on line 39 which sets counters 40, 42, 44 and 46 to a position which is determined by means of the multiple connection 31 of counter 30 at the moment the signal 35 appears. This content of counter 30 is a measure of the period length of two successive like signal changes on data bus 1, when the frequency of clock generator 20 is assumed to be constant, and the individual part periods or sub-periods can be derived from this counter position of counter 30. With the next edge of clock signal 21, counter 30 is now reset to the initial position and then begins to count afresh, whereby the duration of the next period is measured. This measurement yields in fact somewhat too short a time between two successive signal edges on data bus 1 because during the two successive signals on lines 35 and 37, i.e. during two periods of clock signal 21, the counter is blocked, and furthermore a certain inaccuracy arises due to the fact that the edges of the signal on data bus 1 are asynchronous to the clock signal 21, but the total error produced by this is small if the frequency of the clock signal 21 is much higher than the frequency of the signals on the data bus. Typical values of the clock signal 21 are, for example, a few MHz, whereas the frequency of the signal on the data bus amounts, for example, to a few kHz. The capacity of the counter 10 must then be appropriately designed, i.e. must embrace approximately 10 to 12 divisor stages in one binary counter.

Counters 40, 42, 44 and 46 are now set not to the same position which counter 30 has reached at the moment the signal is on line 39 or 35, i.e. immediately after the negative signal edge on data bus 1, but to a position shifted by a few places with respect to this. In the case of counter 40 this position is shifted by three places, i.e. the bit with the fourth lowest significance of counter 30 determines the position of the least significant bit of counter 40 etc., so that the three least significant bits of counter 30 are not taken into account for this. Counter 40 receives the clock signal 21 at a down-counting input and now counts down from the set position to the zero position at which a "1" is generated on line 41. Because the counter position is shifted by 3 bits, this takes place after about an eighth of the number of clock signals on line 21 which the counter 30 had previously counted during a period of the data signal on data bus 1, i.e. after an eighth of such a period and therefore approximately in the middle of the first sub-period U1 in FIG. 2.

Figure 5A:
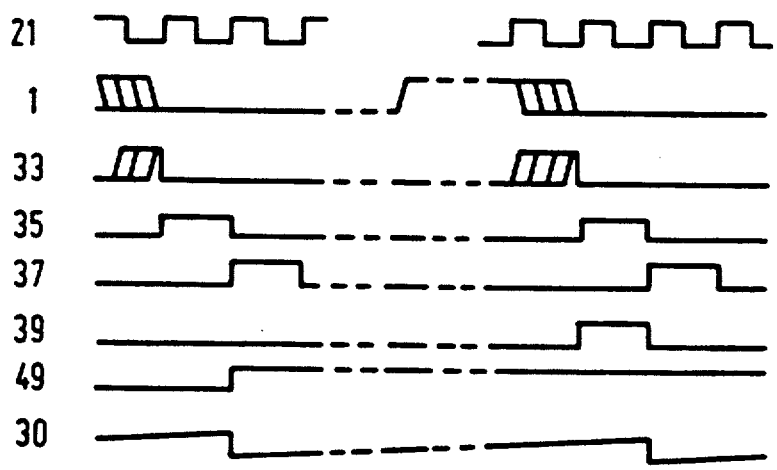
FIG. 5a to 5c time-dependency diagrams of a number of signals of the arrangement in FIG. 4.
Figure 5B:
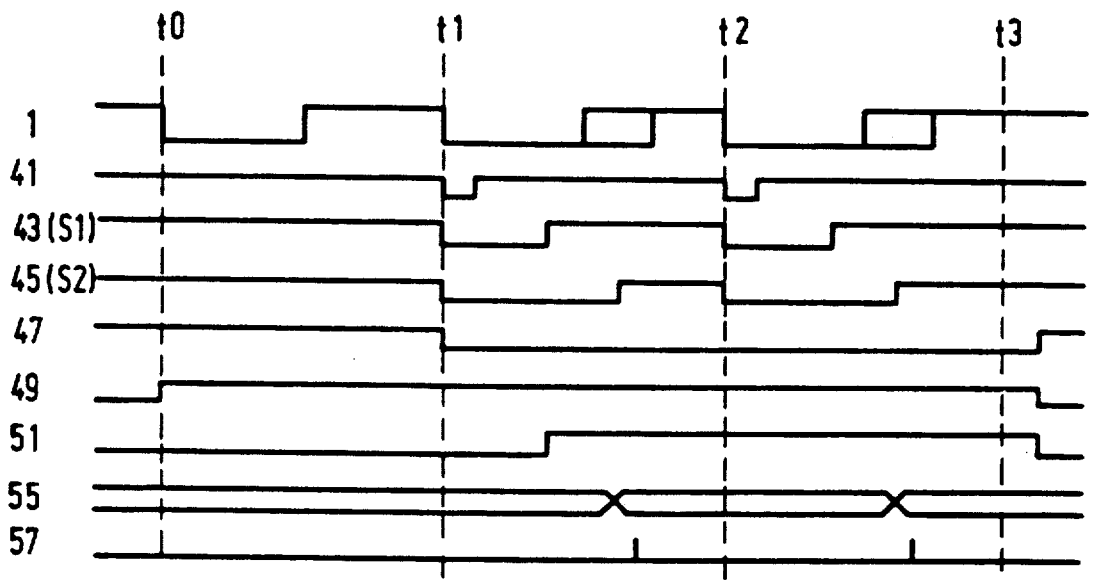

These relationships are illustrated in FIG. 5b in a much compressed time scale compared with FIG. 5a. At time t0 there occurs the first edge in the signal on data bus 1 which is shown on the left in FIG. 5a and represents the beginning of a data transmission. This assumes the situation that outside of a data transmission there is constantly a high signal on data bus 1 or that with the start of a data transmission from a new station a jump occurs in the period length during the next transmission so that a full period length has to be measured first of all in which no transmission of a datum can take place. As was explained with the aid of FIG. 5a, from this first signal edge on data bus 1 at time t0 to the next signal edge at time t1 only counter 30 is working to measure the duration between these two edges, while counters 40, 42, 44 and 46 are in the zero position and the lines 41, 43, 45 and 47 constantly carry a high signal, as FIG. 5b shows. Only the D-flip-flop 48 has been reset immediately after the signal edge at time t0 so that line 49 assumes a high potential at this point in time.

With the signal edge occurring on data bus 1 at time t1 the counters 40, 42, 44 and 46 are set to a fraction of the position of counter 30 reached at this time; in fact, as already explained, counter 40 is set to a value shifted by three places, corresponding to an eighth of the total period length, while counters 42 and 44 are set to a value shifted by two places corresponding to a quarter of the total period length and counter 46 is set to a value shifted by one place corresponding to half the total period length. With the setting of counters 40, 42, 44 and 46 which thus at the same time represent memories for the counter position of counter 30 reached at this moment, the signals at the outputs 41, 43 45 and 47 of these counters go to zero, as shown in FIG. 5b. Because the outputs 41, 43 and 45 lead to a counting-release input of the counter which follows in each case, at the beginning only counter 40 counts the clock signal 21 which for the rest is also fed to the counting inputs of the other counters.

When counter 40 after an eighth of the total period length, i.e. approximately in the middle of the first sub-period, has reached its zero position again and the signal at output 41 again becomes high, this counter is blocked by this output signal and, on the other hand, counter 42 is released which now counts for one quarter of the total period length and thus after three eighths of the total period length, i.e. in the middle of the second sub-period, reaches its zero position as a result of which the signal at output 43 becomes high. This signal, on the other hand, is also the first sampling signal S1 which is fed to the clock input of an edge-controlled D-flip-flop 50 the D-input of which from line 1a receives the inverted signal of the data bus 1. Because the latter is low at this time, the inverted signal is high, and the D-flip-flop 50 is set, as the result of which output 51 carries a high "bus occupied" signal. This signal is also fed among other things to the processing unit 100 which is indicated only schematically here and which can use this signal for appropriate control purposes.

The high signal at output 43, on the one hand, blocks further counting of counter 42 and, on the other, enables the counting of counter 44 which, after a fourth of the total period length, i.e. approximately in the middle of the second part period, reaches its zero position and then generates a high signal at output 45. This signal blocks further counting of counter 44 and, on the other hand, represents the second sampling signal S2 which is fed to one input of an AND element 52 the other input of which receives the "bus occupied" signal on line 51 and the output of which is connected to the clock input of a further edge-controlled D-flip-flop 54. Because the sampling signal S2 in the arrangement shown here can, of course, in the normal course of events occur only when the "bus occupied" signal is present, the AND element 52 acts here essentially as security against disturbed or wrongly triggered sequences of the counting arrangement of counters 40, 42 and 44 and can, where appropriate, also be omitted, in which case the sampling signal S2 leads directly to the clock input of the D-flip-flop 54.

The D-input of flip-flop 54 is also connected to line 1a which carries the inverted signal to data bus 1. D-flip-flop 54 therefore evaluates the signal on the data bus approximately in the middle of the second part period, in which the signal is determined therefore by the logic value of the data bit transmitted on data bus 1, so that a signal corresponding to this logic value appears at output 55 of flip-flop 54 and is fed to the processing arrangement 100. In line 55 in FIG. 5b, the writing-in of the data bit value on data bus 1 is indicated by the intersection of the two lines.

The sampling signal S2 passes moreover to a delay stage 56 which at output 57 issues a signal which is delayed with respect to the sampling signal and feeds it to the processing unit 100 in order to indicate to the latter from when a data signal fed via line 55 is valid. This delayed signal on line 57, designated as the data clock, is indicated in FIG. 5b merely by a vertical stroke for the sake of simplicity.

With the next negative edge of the signal on data bus 1 at time t2 the same operations are repeated to evaluate the next transmitted data bit. The total period beginning at time t2 may simultaneously be the last total period of the transmission operation concerned, and it ends at time t3 at which, therefore, no further negative edge will then occur in the signal on data bus 1. Now counter 46 can come into operation, which had already begun to count previously when counter 44 had reached its zero position, but counter 46 could not yet reach its zero position because this would only occur one half of a total period length after the positive edge of the signal on line 45, i.e. approximately one eighth of the total period length after the beginning of the next following total period, as a result of which counter 46 was previously already set again into a position corresponding to the position reached by counter 30 at the end of a total period. Because at time t3, however, no new total period now begins, counter 46 is not reset again and can reach its zero position after the end of the last total period of the completed data transmission so that the signal at output 47 again becomes high. As a result, D-flip-flop 50 is now reset so that the "bus occupied" signal on line 51 becomes low again, and furthermore the edge-controlled D-flip-flop 48 receives a positive signal edge at the clock input so that this flip-flop flips back again and line 49 assumes a low signal again. Thus the arrangement is returned again to the rest position and can evaluate the start of a new data transmission.

The arrangement illustrated in FIG. 4 also contains a part which generates the signal on line 15 for the send arrangement as per FIG. 3. This part contains a bistable circuit which contains two cross-coupled NOR elements 62 and 64, where the latter generates the signal on line 15. The other input of the NOR element 62 is connected to the output of an AND element 60 one input of which is connected to line 53 which, when the bus is not occupied, i.e. D-flip-flop 50 is reset, carries a signal which is the inverse of the "bus occupied" signal on line 51. The other input of AND element 60 is connected to a line 69 which comes from the processing unit 100 and which carries a signal corresponding to a logic "1" when the processing unit contains data for transmission, in which case, where necessary, other conditions can also be taken into account. This line 69 further leads via an inverter 68 to one input of a further AND element, of which another input receives the "bus unoccupied" signal on line 51 and a further input receives the second sampling signal S2 on line 45. The function of this arrangement is explained with the aid of FIG. 5c.

Figure 5C:
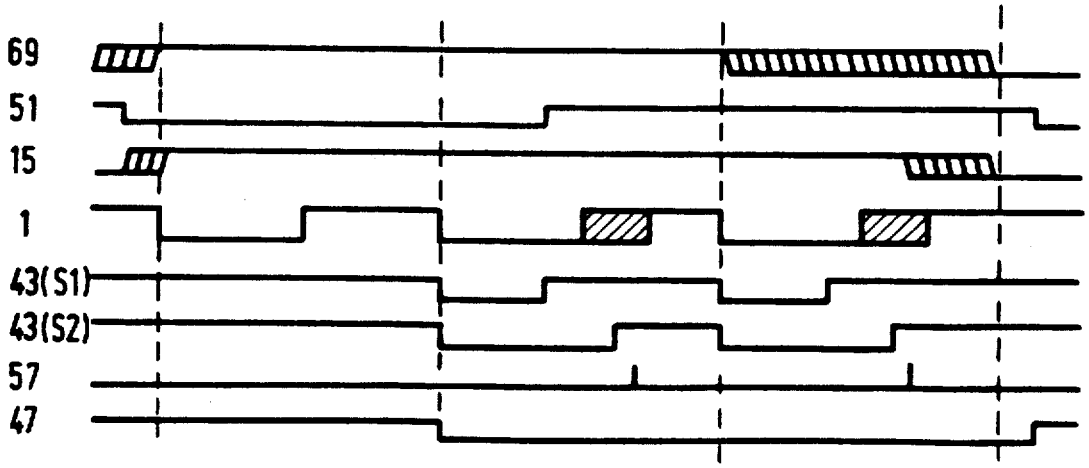

It is assumed that the signal on line 69 which signals the desire of the processing unit 100 to send data can occur at any point in time, which is indicated on the left in FIG. 5c by the multiple edges of the corresponding signal. If this signal occurs in the case of an occupied bus, i.e. when the signal on line 51 is still high, the data bus must first become vacant and the appropriate signal on line 51 must become low, as a result of which the signal on line 53 becomes high. As soon as this happens or as soon as with a high signal on line 53 with the bus not occupied the signal occurs on line 69, the AND element 60 generates a logic "1" at the output. Thus, irrespective of the signal at the other input, the NOR element 62 generates a logic "0" at the output. Because at this moment the AND element 66 receives a low signal both via line 51 and from inverter 68, it generates a logic "0" at the output, so that the NOR element 64 receives such a signal at both inputs and generates a logic "1" at the output and thus on line 15. As soon as the sequence control 4 in FIG. 3 creates a signal at output 3 and the next edge of the clock signal 21 appears, a low signal is generated on data bus 1, it being assumed that switch 22 is in the bottom position, i.e. the signal on the data bus is high between successive data transmissions. As already described, the low signal lasts for half the duration of the total period because no datum can yet be transmitted in the first period since the duration of the period has to be evaluated first of all in all receiving stations. Furthermore, the other part of FIG. 4 also acts as a receiver in a similar way to as described before because the arrangement cannot differentiate from which source the signals on the data bus arrive. Thus in the next period in FIG. 5c, counters 40, 42, 44 and 46 begin to operate again. And also the line 51 changes its state and indicates an occupied bus. In addition, in the second part period of this and the next total period the signal on data bus 1 has a value which is dependent on the logic value of the data bit to be transmitted; this is indicated in FIG. 5c by a shaded area in the relevant signal on data bus 1. The data clock signal on line 57 is also generated as described before and can be used to feed the next data bit for transmission via line 11 in FIG. 3 to the AND element 14.

To simplify the representation it is assumed that only two data bits are to be transmitted. The signal on line 69 can therefore disappear at any time during the third total period, in which the second and therefore last data bit is transmitted, as is shown in FIG. 5c by the multiply indicated edges in the waveform of this signal. The disappearance of this signal or the changeover to the logic value "0" has no effect on the AND element 60 because the latter has already previously received a logic "0" via line 53. On the other hand, the signal on line 51 has the logic value "1", and a second input of the AND element 66 now also receives via the inverter 68 a signal corresponding to the logic value "1". If now the second sampling signal S2 occurs, the AND element 66 delivers a logic "1" at the output as a result of which the signal on line 15 again becomes low by way of the NOR element 64. This makes it clear that the signal on line 69 must have gone to the logic value "0" no later than the end of the relevant period in order to prevent a new period with a further signal transition occurring on data bus 1.

After the signal on line 69 has returned to the logic value "0" and no further signal transition occurs on data bus 1, counter 46 can reach its zero position after the end of the third period, as a result of which the signal on line 47 becomes high again and resets the D-flip-flop which means in turn that the "bus occupied" signal on line 51 becomes low again. This terminates the data transmission, and can be followed by the reception of another data transmission or the beginning of a further data transmission from this station.

DESCRIPTION OF A FURTHER ARRANGEMENT FOR THE EVALUATION OF THE DATA BUS SIGNAL

Figure 6:
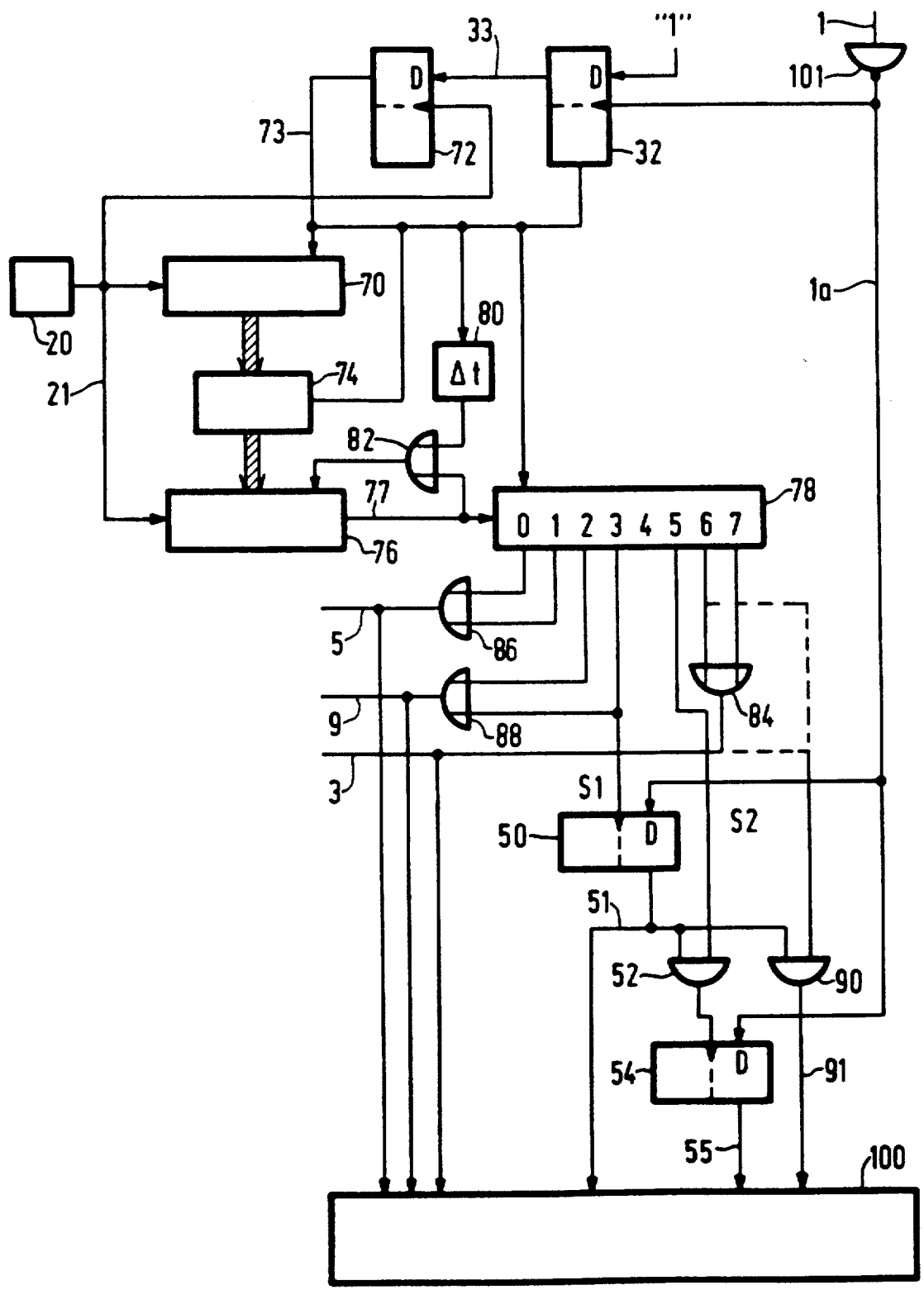
FIG. 6 another arrangement for the evaluation of the signal on the data bus in a station.

FIG. 6 depicts another arrangement for the reception and evaluation of the signals on data bus 1. These signals from data bus 1 are again passed via the inverting amplifier 101 to the line 1a where a high signal represents the logic value "1" on data bus 1. This signal goes, in the same way as in FIG. 4, to the clock input of the edge-controlled D-flip-flop 32 and the D-inputs of the D-flip-flops 50 and 54. With the negative edge of a signal on data bus 1, i.e. with the positive edge of the signal on line 1a, the D-flip-flop 32 is set and generates a high signal on line 33. Here, however, this signal goes to the D-input of a further D-flip-flop 72 which at the clock input receives the clock signal on line 21 and thus with the next leading edge of this clock signal generates a high signal at the output 73. This resets the D-flip-flop 32 and sets a counter 70 to an initial position, and at the same time the last reached reading of counter 70 is written into a register 74. This therefore fixes the storage of the counter reading of counter 70 and its resetting for a joint time, which is quite possible with many commercial counter and register modules, and furthermore the blocking of the counting of counter 70 at this point in time is dispensed with. Counter 70 corresponds to counter 30 in FIG. 4 and also has the same function.

The line 73 also leads to a delay stage 80 which a short time after the positive signal on line 73 generates an output signal which is fed via the OR element 82 to the setting or loading input of a further counter 76 which with this signal takes over the output signal of register 74. The delay time of the delay stage 80 must correspond therefore at least to the transit time of the signals in register 74. Counter 76 now down-counts with the clock signal 21 until it has again reached the initial position as a result of which a signal appears at output 77. This output is connected via the OR element 82 once again to the setting input of counter 76 and to the counting input of a further counter 78. By means of the first connection the counter is thus set again to the position contained in register 74 and counts down again, and this operation is repeated several times.

This multiple repetition is achieved by the fact that the register 74 does not directly take over the counter reading of counter 70, but the counter reading shifted by three binary digits, in which case the last three least significant bits are omitted. Instead of this, the register 74 may also take over the complete counter reading and feed this, shifted by three digits, to counter 76. In each case, counter 76 is set to a position which corresponds approximately to one eighth of the counter position of counter 70 so that during successive total periods of the signals on the data bus, counter 76 is set and returns to the initial position eight times. In fact, somewhat more than eight cycles of counter 76 take place in one period since the last digits of the reading of counter 70 are not considered; however, in the case of a sequence of total periods of equal length, as occurs with a data transmission, shortly after the start of the ninth cycle of counter 76, a signal occurs at the output of delay stage 80 on account of the start of the next period of the signal on data bus 1 so that counter 76 is then reset once again to the position derived from the counter position of counter 70 and is thus re-synchronized once again.

The counter 78 receives a counting pulse with every cycle of the counter 76, when this reaches its initial position again, and it has at least eight counter positions and for every counter position an appropriately designated output at which a high signal appears when the counter finds itself in the like-designated counter position. At the beginning of a period of the signal on data bus 1, the counter 78 is set by the signal on line 73 to the position 0. Because the counter 76 issues a signal at output 77 every time after one eighth of the duration of the total period, the positions 0 and 1 of counter 78 represent the first sub-period, positions 2 and 3 represent the second sub-period and positions 4 and 5 represent the second part period. In this case the counter position 3 is approximately in the middle of the second sub-period and thus forms the first sampling signal S1, and counter position 5 begins approximately in the middle of the second part period and thus forms the second sampling signal S2.

The sampling signal S1 goes to the clock input of an edge-controlled D-flip-flop 50 the D-input of which is connected to the line 1a and corresponds in function to the D-flip-flop in FIG. 4, i.e. the "bus occupied" signal appears again at its output 51. This signal is fed both to the processing unit 100 and to one of the inputs of AND elements 52 and 90. The first of these receives the second sampling signal S2 at the other input and leads to the clock input of the edge-controlled D-flip-flop 54, the D-output of which is also connected to line 1a and which corresponds to the like-designated D-flip-flop in FIG. 4, i.e. a signal appears at output 55 corresponding to the data bit value transmitted via data bus 1 which is also fed to processing unit 100. At the other input the AND element 90 receives a signal which occurs after the second sampling signal S2, for example the signal at output 6 or at output 7 of counter 78 of the combination of the two output signals at the output of OR element 84, this being indicated by the dashed lines, and a signal appears at output 91 of the AND element 90 which indicates that the data signal present on line 55 is valid and which is therefore designated the "data clock signal" and fed to the processing unit 100. In contrast to the arrangement in FIG. 4, the AND element 52 is necessary here because the sampling signals S1 and S2 are generated all the time, i.e. also outside of a data transmission. This also applies to the AND element 90 used here for the data clock.

As already mentioned, with the arrangement as shown in FIG. 6 the two outputs of counter 78 for the counter positions 6 and 7 are combined by way of the OR element 84, and the output of this is designated like an output of the sequence control 4 in FIG. 3 by the FIG. 3, because in the arrangement according to FIG. 4 a signal appears at this output also in the third part period, that is before the start of the first sub-period of the following total period; this signal can be fed to the AND element 10 and therefore to the D-input of the D-flip-flop 6 in FIG. 3. The clock signal on line 21' is suitably derived from the signal on line 77 in FIG. 6 so that the changeover of counter 78 to the position 0 sets the D-flip-flop 6 in FIG. 3, and a low signal corresponding to a logic "1" is generated on data bus 1 by way of the inverting amplifier 18.

This indicates the beginning of a new period during which by resetting by means of line 73 counter 78 is set into the position in which, however, it already finds itself so that in this way there is automatically synchronism between sending and receiving.

Similarly, the outputs corresponding to counter positions 0 and 1 of counter 78 are combined by way of the OR element 86, the output of which is designated 5, and the outputs for counter positions 3 and 4 are combined by means of the OR element 88 the outputs of which are designated 9. All the outputs 3, 5 and 9 are connected as shown in FIG. 3 which means therefore that the sequence control 4 illustrated there can be omitted or is replaced by the counter 78 in FIG. 6. This results in a particularly simple and cost-saving arrangement in which, moreover, when data are being sent from the station concerned, of which the arrangement in FIG. 6 forms a part, there is easy synchronization of the period duration during sending with the period duration of a signal previously received via the data bus. The outputs 3, 5 and 9 are also connected to the processing unit 100 to enable the latter to effect particularly simple control of the send-control signal on line 17 in FIG. 3.

The arrangements illustrated in FIGS. 3 and 4 or 6 contain logic elements, D-flip-flops and counters which are available for example as integrated circuits. However, these elements can also be implemented by a microprocessor which can assume the role of the transmitter for control of the inverting amplifier 18 in FIG. 3 and the role of the receiver as in the arrangements in FIG. 4 or 6. This is made particularly simple because a relatively low data transmission speed of, say, a few kHz or even less is assumed. The microprocessor can then also take over the function of the processing unit 100 which results in a very inexpensive implementation.

The individual functions are executed by a program which implements the elements described in FIGS. 3 and 4 or 6 in time-division multiplex by the appropriate elements of the microprocessor and which is stored in a memory which is produced together with the microprocessor on a single semiconductor wafer.

DESCRIPTION OF SEQUENCE CONTROLS FOR SENDING AND RECEIVING

Figure 7:
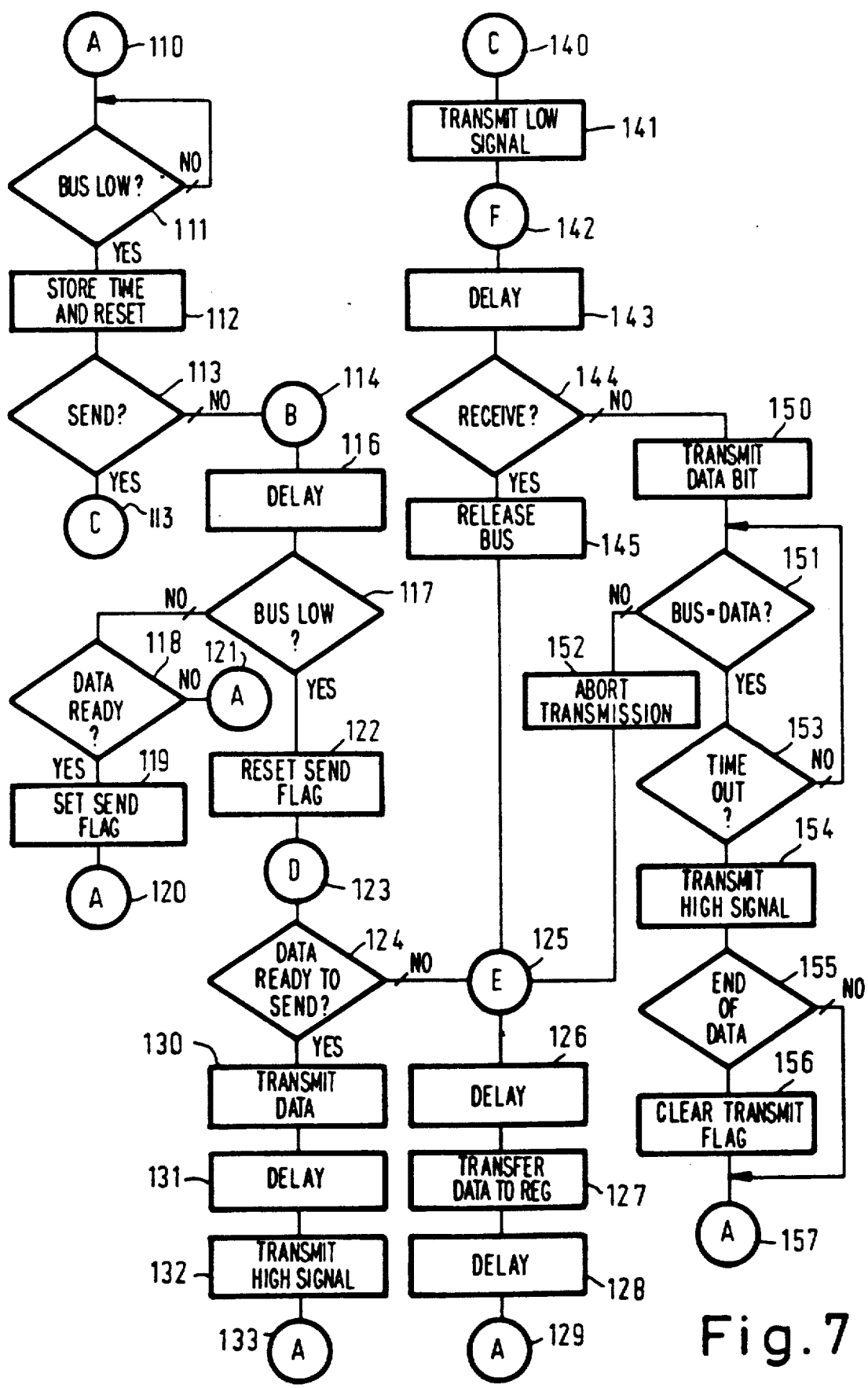
FIG. 7 Shows a flow diagram for the programming of a microprocessor for sending and receiving data.

FIG. 7 shows a flow diagram for the programming of a microprocessor when this processor performs the sending and receiving of information in a station whereby it is assumed that from any point a low signal is constantly generated on the data bus in the first sub-period U1 in FIG. 2.

The sequence begins at point 10 which is designated A, but which in the strict sense is not a starting point because the sequences illustrated in FIG. 7 are passed through in a continuous repeated cycle. This is followed in block 111 by the enquiry whether the data bus carries a low signal. Instead, an interrupt signal may also be released with the changeover to a low signal on the data bus, in which case block 111 then represents a wait loop and the interrupt signal effects a jump to the output of the wait loop.

The changeover to a low signal on the data bus marks the beginning of a new period, and in block 112, which is thereby passed through, the contents of a time counter are transferred to a time register and the time counter is re-set to zero. The time register thus contains a measure of the duration of the preceding period.

In the next block 113 the status of a flag is interrogated which decides whether the station is in the send or the receive condition. If the station is in the send condition, the sequence proceeds by the way of the point 115 marked C, and its continuation is explained later. In the state of rest, however, the station is in the receive condition, and the sequence proceeds via the point 114 designated B to the block 116 in which there is a wait until the time counter reaches a value of $\frac{1}{2}T$ where T is the content of the time register. This point of time lies in the middle of the second sub-period U2, in which the signal status on the data bus indicates whether the bus is free or whether another station is making a transmission. A check is made therefore in block 117 whether the signal is low on the data bus. If this is not the case, a transmission is not being made from any station so that a check can be made in the station under consideration whether a transmission is required, i.e. whether there is data present for transmission. If this is not the case, the sequence proceeds via point 121, which for the sake of clarity is designated A, back to point 110, as a result of which the loop indicated at block 111 is passed through until the signal on the data bus becomes low again, i.e. until a new period begins. Thus the described sequence is repeated for as long as no transmission takes place from any station.

If, on the other hand, a data transmission is to be started from the station in question, then after the appropriate interrogation in block 118, block 119 is passed through, at which the flag already mentioned is set. This flag may also be a counter to the contents of which a unit is added in block 119. Then the return takes place in fact via point 120, also designated A, to point 110, and with the beginning of the next period the interrogation is run through again in block 113 in which a check can now be made whether the flag counter has reached a certain value. Depending on this value, a priority can in fact be assigned to the respective station, i.e. in the case of a larger value, several periods must be run through after the end of a previous transmission until the relevant station has finally reached the preset value in the flag counter so that another station with a smaller value can begin earlier with the transmission and can therefore, to begin with, block all other stations.

It is assumed first of all, however, that another station has begun a transmission so that, when the interrogation is made in block 117, which takes place therefore in the middle of the second sub-period U2, a low signal is established on the data bus which identifies the data bus as being engaged so that a changeover is then made to block 122 in which the flag counter is set to its initial value, in which case this necessity arises due to the explanation given above. Then the process goes by way of point 123 which is designated D to block 124 in which a check is made as to whether the station concerned, which is passive and is not transmitting, within the framework of a data exchange with the station now transmitting is to actively send data back to the latter, as was described earlier. If this is not the case, i.e. the station under consideration here is receiving only, a changeover is made via the point 125 marked E to the block 126 at which there is a wait until the time counter has reached the value ½T, because this is the middle of the part period T2 in which the value of the data bit to be transmitted appears as a signal on the data bus. When this point of time is reached, then this value is transferred in block 127 to a data register or data store, and this is followed by a wait in block 128 until the time counter has reached at least the value ¾T, at which the signal on the data bus in high. This is followed by a return via the point 129, which is also designated A, to the point 110 to receive the next data bit.

If provision is made that during a data exchange the first station to receive can also return data to the sending station, and it has been ascertained in block 124 that the receiving station in question is suitably prepared by the information received, the sequence moves to block 130 in which the value of the data bit to be transmitted is transmitted as a signal along data bus 1 by appropriate driving of amplifier 18 in FIG. 3. In this case the second part period 2, which is allocated to the data transmission, has not yet been reached in fact, but this prevents a false, albeit only a short-time signal transition being created on the data bus on the changeover to this part period 2. Such a signal transition can only arise if the sending station generates a high signal on the data bus or places the outer amplifier in a high-ohmic state so that the station under consideration here can determine the signal on the data bus, but only generate a low signal after the high signal has appeared on the data bus. In each period, in fact, only a negative edge may occur, and this at the beginning of the period. In the next block 131 it is waited until the time counter has reached the value ¾T while the signal condition on the data bus is maintained. When this point in time is reached, part period T2 is completed, and the last part period T3 now begins, in which a high signal is again generated on the data bus. This is followed by a return via the point 133, which is again designated A, to the point 110 and a wait unitl the beginning of the next period.

When a wish to transmit is present in the station under consideration here and when it is ascertained on running through the interrogation in block 113 at the beginning of a new period that the appropriate flag is set or the flag counter has reached the specified value, the changeover takes place from point 115 to block 141 via point 140 which is also indicated by C, by means of which a low potential is generated on the data bus.

This takes place in fact at the beginning of the first sub-period U1, during which a low potential is already present on the data bus, but this low signal is maintained by the station under consideration for the purpose of identifying the data bus as engaged even during the second sub-period, so that the situation is reached in the appropriate manner as described previously where no interfering edges occur in the signal on the data bus. Then the transition takes place via point 142 marked F to block 143 where there is a wait until the time counter has reached the value ½T, from which point on the transmission of a data bit begins.

This is followed in block 144 by the interrogation as to whether another station which has been addressed by the station under consideration is to transmit data back. If in fact a transmission is to take place from the other, addressed station back to the station under consideration, the amplifier connected to the data bus must be made high-ohmic in block 145, so that the signal on the data bus can then only be determined by the other station, and then the transition takes place via point 125, which is designated E, to the already described sequence for the reception of data bits.

If it is established in block 144 that no transmission is to be made from the other station to the station under consideration, i.e. the latter is to continue transmitting normally, the changeover is made to block 150 in which a signal corresponding to the data bit to be transmitted is supplied to the data bus. The sequence then proceeds to block 151 where it is checked whether the signal on the data bus corresponds to the signal which is generated in the station under consideration by the data bit just transmitted. It is possible in fact that two or even more stations have begun a transmission exactly simultaneously with the same period. First of all, this fact may not immediately be recognized by the simultaneously transmitting stations because no station can ascertain that the signal on the data bus was made low by a corresponding amplifier in another station as well as by its own amplifier. If, however, in the case of the consecutive transmission of bits, which may comprise, for example, the address of the transmitting station, another station generates a low signal on the data bus, this station can now establish that at least one other station is still transmitting simultaneously, and take itself out of the tramsmitting condition so that disturbances of the signals transmitted by the other stations are avoided. In this way, ultimately only one transmitting station remains which transmits a low signal most frequently during the second part period T2 during which the data are transmitted.

The subordinated station under consideration here must now pass over into the receiving condition, however, because it is possible that the transmitting station which finally remains will address the station under consideration. For this reason, if it is established in block 151 that the signal on the data bus does not correspond to its own transmitted signal, block 152 in which the flag or flag counter for the send condition is re-set to the initial position is run through, as the result of which the station quits the send condition, and the subsequent operation passes via point 125 once again into the receiving branch from blocks 126 and 128.

If, however, it is established in block 151 first of all that the signal on the data bus corresponds to the tansmitted data bit, a check is made in block 153 whether the time counter has reached the value ¾T, and as long as this is not yet the case, a return is made to block 151 and in this way a check is made throughout the entire second part period T2 whether the data signal on the data bus corresponds to the transmitted signal. When ultimately the end of the second part period T2 is reached, the operation switches to block 154 which generates the high signal on the data bus during the third part period T3, and in the following block 155 a check is made whether the data transmission has ended, i.e. whether all the data to be sent has been transmitted. As long as this is not the case, the procedure passes via point 157, which again is designated A, on to point 110 where the beginning of the next total period is awaited.

If, however, the transmission has been completed, block 156, by means of which the flag of flag counter is set to the initial state, is run through, and the send condition of the station under consideration is terminated. The further sequence then also proceeds via point 157 to point 110. In this way all possible conditions of the station are taken into consideration.

Figure 8:
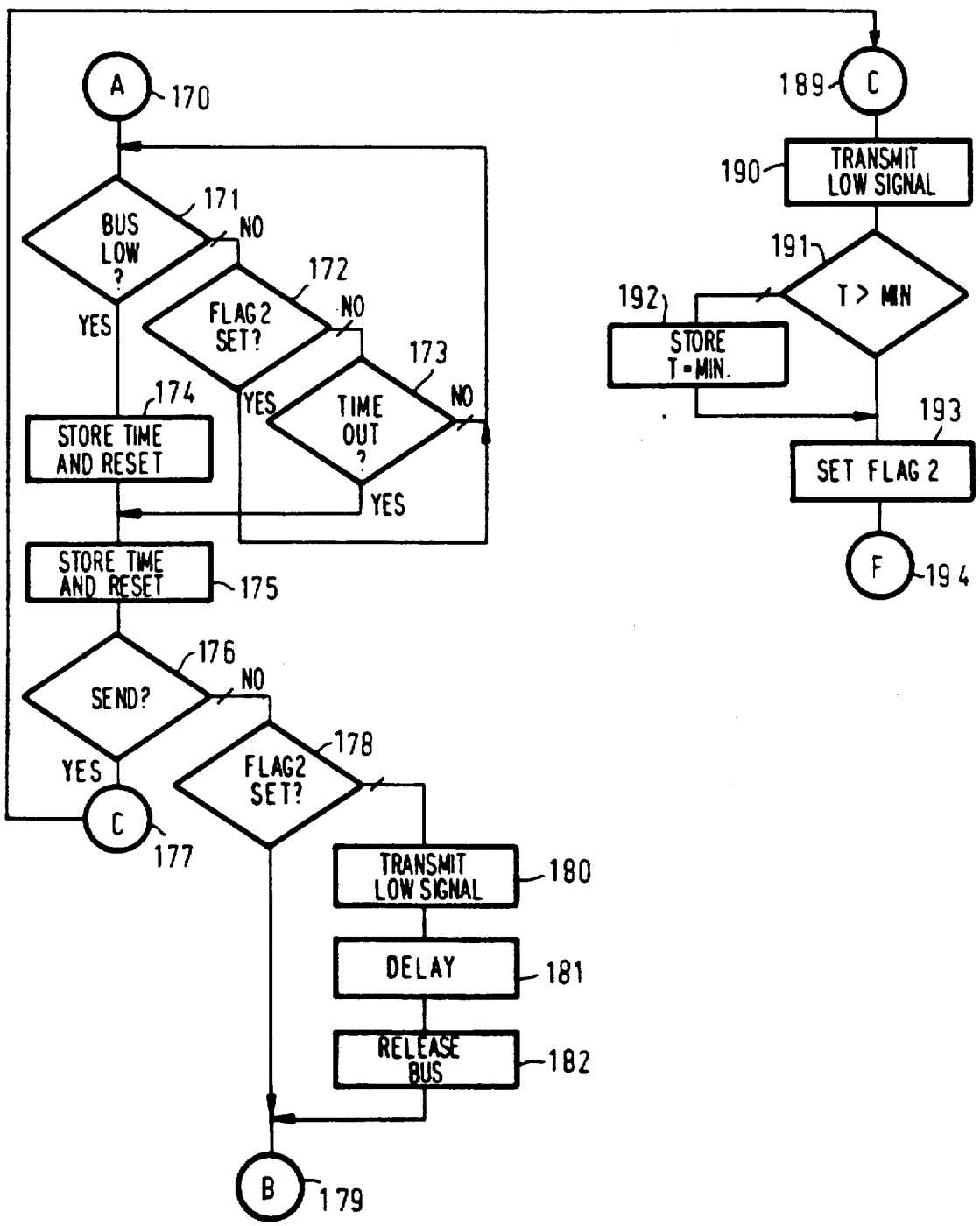
FIG. 8 Shows variations of the sequence compared with that in FIG. 7 where no special clock generator generates the signal transition at the beginning of each period.

FIG. 8 shows variations of the sequence compared with that in FIG. 7, if it is assumed that no special clock generator which generates the individual periods or the signal transition at the beginning of each period, is connected to the data bus, but each station which has transmitted data generates the signal for the periods susequently, i.e. the low signal during the first sub-period U1, until such time as another station begins to transmit and, in its turn, generates the signals for fixing the periods.

Only when the installation is switched in from the individual stations connectd together by the data bus does one of the stations have to take over the generation of the signals for fixing the periods without a previous transmitting operation. This can be easily achieved as follows; in this one station the re-set signal which is normally generated during switching on has a flag, which will be explainded later, and fills the time register with a pre-set value. It is expedient then for this station at least to have a time control system (not described in any further detail) which responds when due to a fault or disturbance the generation of the signals for fixing the periods fails, and then initiates the operation as in the case of switching on of the installation.

In this case, the point corresponding to point 110 in FIG. 7 is point 170 also designated A. First of all, the sequence passes through block 171 in which, as with block 111 in FIG. 7, a check is made whether the signal on the data bus has become low. If this is not the case, then block 172, however, is run through here; in this block the condition of a second flag is interrogated which is set if this station is to generate the signal transition at the beginning of each period. The setting and canceling of this flag is explained later.

When this flag is in a state of rest, the signal transition at the beginning of each period is generated therefore by another station, and the system reverts to block 171, and this sequence repeats itself until the signal transition at the beginning of the next period appears. If, however, it is ascertained in block 172 that the second flag is not in a state of rest, i.e. the station under consideration here must generate the signal transition, the operation swtiches to block 173 in which it is checked whether the time counter has reached the value T stored in the time register. As long as this is not the case, the chain of blocks 171 to 173 will be run through. Finally it is established by interrogation in block 173 that the time counter has reached the value in the time register, and then the operation is also switched to block 175 in which case the transmission of the contents of the time counter to the time register is not in fact necessary, but simply the re-setting of the time counter; however, for reasons of simplicity and clarity this block is also used here. Then, a check is made in block 176, in the same way as in block 113, as to whether the first flag or flag counter contains its pre-set value and, if it does, further procedure takes place via the point 177, designated C, as will be explained later.

If, however, the send condition has not yet been assumed, operation switches from block 176 to block 178, where it is checked whether the second flag is in the rest condition. If it is, i.e. the station under consideration is not to generate a signal transition at the beginning of each period, the operation is switched via point 179, which is designated B, to the correspondingly designated point in FIG. 4. If, however, the second flag is set, the switch is made from block 178 to block 180 which has the effect that a low signal is generated on the data bus. For all stations this is the beginning of a new transmission period. In block 181 there is a wait until the time counter has reached the ¼T value, i.e. the end of the first sub-period is reached, and then in block 182 the amplifier connected to the data bus is made high-ohmic again so that in the normal situation the data bus again carries a high signal. Then, the switchover is also made via point 179 to point 114 in FIG. 7. If it is now established there in block 117 that the data bus carries a low signal, this is the sign that another station has begun to transmit and generates the "bus occupied" signal in the second sub-period, and thus in block 122 the second flag is set into the rest condition, in addition to the first flag or flag counter which, of course, is generally already in the rest condition. Otherewise the remainder of the procedure is as described with the aid of FIG. 7.

If it is established in block 176 by interrogation that the first flag or flag counter has attained its pre-set value, the operation switches via point 177 designated by C to point 189 also designated by C and then block 191, in which a low signal is brought to the data bus, is run through in the same way as block 141 in FIG. 7.

A check is made in block 191 to ascertain whether the content of the time register is greater than a minimum value. It must be remembered in fact that a station which begins to transmit performs this with a value of the period length which has been taken over from the last station to transmit before it, in which case the fraction of an internal clock pulse period at the end each time of a transmission period disappears so that with every reversal the durations of the transmission periods become somewhat shorter. If, therefore, the content of the time register falls below a minimum value defined in the station concerned, then in block 192 this minimum value is written instead into the time register. This is followed, irrespective of the value in the time register, by block 193 in which the second flag is set, and the operation switches via point 194 designated F to the similarly designated point 142 in FIG. 7 and the sequence illustrated and described there takes place.

Figure 9:
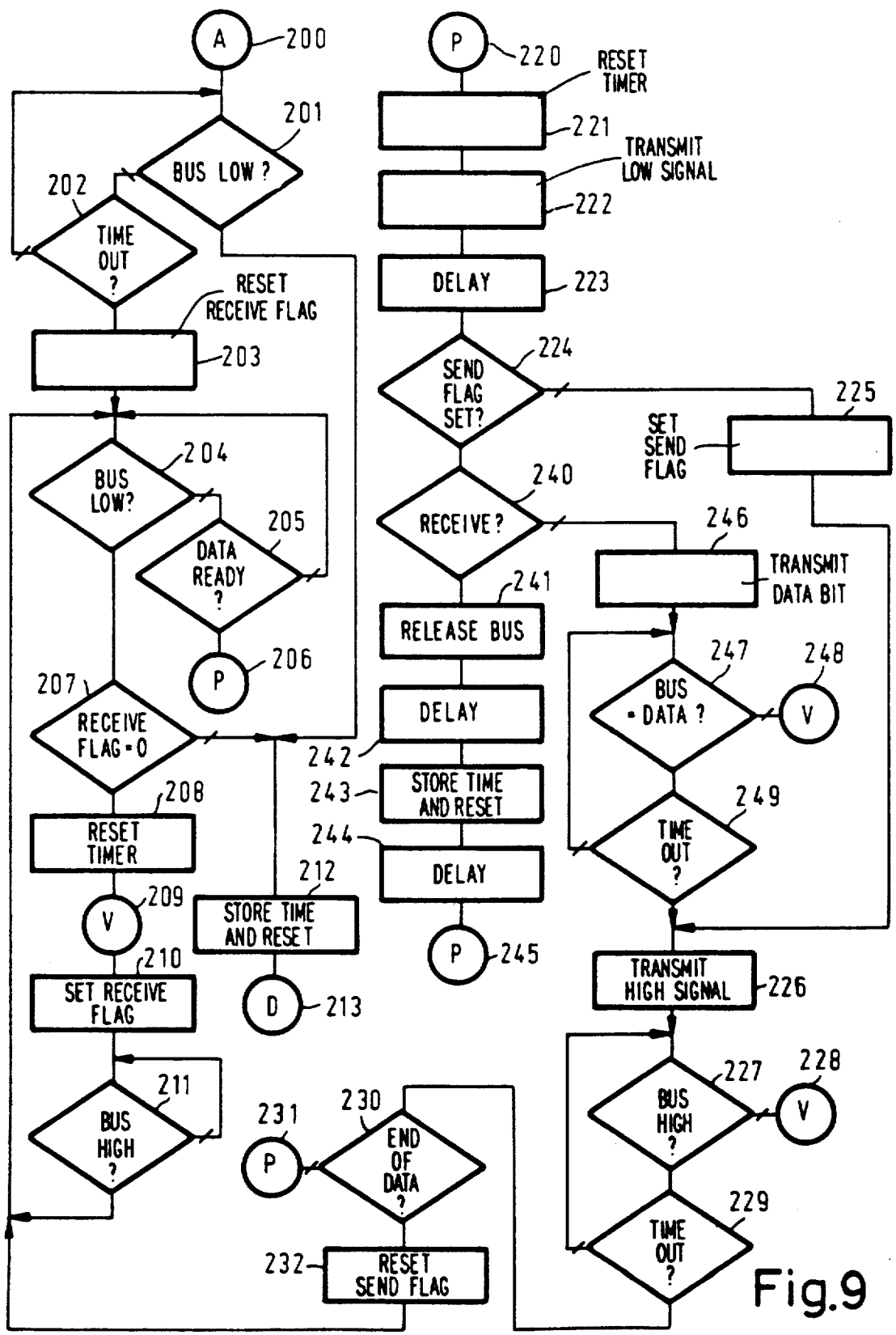
FIG. 9 Shows an example of operation when during pauses in transmission of information bits no signal transitions are generated on the data bus.

FIG. 9 shows an example of an operation when durring transmission pauses during which no station transmits an information bit, no signal transitions are generated either on the data bus.

After point 200, which is designated A and which corresponds to point 110 in FIG. 7, the operation passes through block 201, in which it is again checked whether the signal on the data bus has become low. As long as this is not the case, the operation then switches to block 202 in which it is checked whether the time counter has attained a value which is a specified fraction above the value stored in the time register. If, in fact, the station under consideration here was last receiving, and the transmitting station has completed the transmission, this is recognizable from the fact that after expiry of the last period length, whose value is stored in the time register, no transition of the signal on the data bus to a low value occurs. As long as this is not the case, the loop formed from the two locks 201 and 202 is run through repeatedly.

If a signal transition occurs on the data bus, the operation switches from block 201 to block 212 in which the value of the time counter reached at this momemt is transferred into the time register and the time counter is re-set. Then the operation switches via the point 213 designated D to the similarly designated point 123 in FIG. 7. The corresponding change is made from the end points in FIG. 7 134 or 129 to the point 200.

If, however, at the end of a transmission by another station it is established in block 202 that the time counter has exceeded the duration of the last preceding period by a specified fraction, with which a priority of the station in question can be set by means of this fraction, a receive flag which indicates the current receive status is re-set in block 203 to the initial value. Then a check is made in lock 204 as to whether the signal on the data bus has become low, i.e. whether another station has begun to transmit, and if this is not the case, a check is made in block 205 whether data for transmission is present in the station under consideration here. If this is the case, the procedure switches via the point 206 designated P to the correspondingly designated point 220, with which is linked a transmission sequence, to be explained later. If no data for transmission is present, the process reverts to block 204, and this loop of blocks 204 and 205 is run through until either another station begins to transmit or data for transmission appear in this station.

When another station begins to transmit, a signal transition on the data bus to a low signal is initiated, and the operation switches from block 204 to block 207 in which it is checked whether the receive flag is in the rest condition. As described earlier, in the initial period at the beginning of a transmission no data bit is transmitted, but the first period serves merely for communication of the period length in which transmission will be made subsequently. Initially, therefore, the receive flag is still in the rest condition so that the procedure switches to block 208 in which the time counter is reset to the initial value. The operation then switches via the point 209 designated 209 to block 210 in which the receive flag is set and a send flag, to be explained later, is cancelled, and it is then checked in block 211 whether the signal on the data bus is again high, i.e. whether the first part period has elapsed. Then the operation moves to block 204 where the beginning of the next period is awaited.

With the beginning of the next period it is established in block 207 that the receive flag is no longer in the rest condition, and the operation switches to block 212 in which the value of the time counter is transferred to the time register which thus contains the length of the first period, and the time counter is re-set to zero. The operation then swtiches, as described, via point 213 to point 123 in FIG. 7 where the transmitted data bit is received or, if the transmission direction has been reversed in the meantime, a data bit is transmitted. In the following periods the operation switches via point 200 and block 201 directly to block 212 until the transmission begun by another station is completed.

If a data transmission is to be begun in the station under consideration here, then the operation switches, as mentioned, from point 206 to point 220, and block 221 in which the time counter is re-set to the initial value is run through. In block 222 a low signal is generated on the data bus, and in block 223 there is a wait until the time counter has reached a value $\frac{1}{2}T_p$, where $T_p$ is a value fixed in this station which determines the period length of this station during transmission.

In block 224 it is checked whether a send flag is set. If this is not the case, the period concerned, therefore, is the first period of the send operation, and the procedure moves to block 225 in which the send flag is set, and then in block 226 a high potential is generated on the data bus. In this first period of a transmission operation, therefore, no data is transmitted, but the period length is merely communicated to the other stations.

After block 226 it is checked in block 227 whether the signal on the data bus is in fact high to take account of the situation where two or more stations have begun to transmit simultaneously, in which case a station with longer period length has the result that a switch is made via the point 228 designated V to the correspondingly marked point 209, which is followed by the sequence for the reception of data signals.

If, however, the signal on the data bus is in fact high, the operation switches to block 229 in which it is checked whether the time counter has reached the specified value $T_p$, i.e. a transmission period has been completed. As long as this is not the case, the loop comprising blocks 227 and 229 is run through repeatedly. At the end of the period, the sequence switches to block 230 in which it is checked whether the transmission of data has ended. If this is not the case, the operation switches via the point 231 designated P to point 220, and a further period with a transmission of a data character follows.

In this second subsequent period it is ascertained in block 224 that the send flag is set, and it is checked in block 240 whether a transmission is to take place from an addressed receiving station to this transmitting station under consideration here. If this is the case, then here in block 241 the amplifier connected to the data bus is made high-ohmic, in the same way as indicated in FIG. 7 for clock 144. In block 242 there is a wait until the time counter has reached the value $\frac{1}{2}T_p$, i.e. the middle of the part period is reached at which the signal corresponds to the value of the transmitted data bit, and when this point in time is reached, the signal is taken from the data bus and stored in block 243, and there is a waiting time in block 244 until the time counter has reached the value $T_p$, i.e. a further period has ended. Then the procedure reverts again via the point 245 designated P to point 220.

If, however, data bits are to be transmitted quite normally by the station under consideration here, the operation switches from block 240 to block 246 in which a signal corresponding to the data bit for transmission is brought to the data bus. It is checked in block 247 whether the signal on the data bus corresponds in fact to the signal value on the data bus as determined by the data bit to be transmitted, to allow for the situation where anothr station with exactly the same period length has begun to transmit, as has already been explained with the aid of block 151 in FIG. 7. If this is the case, the procedure is switched via the point 248 designated 248 to the correspondingly designated point 209 and the sequence for the repeated reception of data bits is run through. If, however, the signal generated by this station coincides with the actual signal on the data bus, it is checked in block 249 whether the time counter has reached the value $\frac{1}{2}T_p$, i.e. the end of the second part period T2. As long as this point in time has not been reached, the loop comprising blocks 247 and 249 is run through repeatedly. If the time counter has reached the value $\frac{1}{2}T_p$, the operation switches to block 226, and the subsequent operation has already been described essentially.

Only when the last data bit has been transmitted and it is established in block 230 that the transmission has ended, does the operation not revert via point 231 to point 220, but continues to block 232, in which the send flag is re-set, which means that the station has thus abandoned the transmit condition again. The operation then reverts again to block 204, and the wait loop comprising blocks 204 and 205 for the rest condition is run through until either another station begins to transmit or there is data for transmission present again in the station under consideration here.

The operating sequences described here are given only as examples and can also be structured in other ways. The described operating sequences, in particular, do not contain descriptions of measures for the preparation of data for transmission or the processing of data received, nor especially the measures required for the control of the data when the station has begun to transmit, but has been placed in the receive condition by another station which has begun to transmit simultaneously, since such measures do not form part of the actual operation of the transmission of data to which the invention relates. These measures can be carried out advantageously by the same microprocessor which controls the transmission operations described, during the specified waiting operations for example.

As the foregoing description shows, the data bus is a so-called "single-wire logic bus", i.e. for the moment only a single signal is transmitted which means that in the case of an electrical connection a second wire is required for a reference potential in addition to the signal wire. In the case of a glass fiber connection, however, only one glass fiber is in fact needed. For the rest, however, a special connection is not always absolutely essential, but the signals to be transmitted on the data bus can also be transmitted as more or less undirected sound or light signals or electromagnetic waves of another frequency through the air or in the latter case through free space. In this situation the signal transition from one medium to another, for example from electrical signals to light signals, can be made directly without any special processing. However, supplying individual stations with electrical energy from one or more other stations is feasible in practice only when using electrical lines as the data bus. In order to lengthen the time during which the stations are supplied with energy via the data bus, i.e. in which the signal on the data bus is high, another ratio of the individual part periods or sub-periods to one another may then also be chosen; in particular, the third part period can be lengthened considerably. If, for example, the duration of the third part period takes up five eighths of the total period and the two sub-periods and the second part period each amount to only about an eighth of the total period length, the described shift of the counter reading in the arrangements in FIGS. 4 and 6, for example, must involve an extra digit.

What is claimed is:

1. In a communications network comprising a data bus to which a plurality of stations is connected in a manner that a data signal on the data bus has a first predetermined logic value if any of said stations transmit on the data bus the first logic value and has a second predetermined logic value, opposite said first logic value, if none of said stations transmit on the data bus the first logic value, each station comprising means for communicating via said data bus with the other stations utilizing timing periods in a data signal on said data bus, each successive transition in said data signal from said second logic value to said first logic value beginning a new timing period, each timing period having first, second and third part periods with durations in a fixed ratio to one another, for respective first, second and third signal portions of said data signal, the first signal portion having the first logic value when the data bus is occupied for transmission from one of said stations and the second logic value when the data bus is unoccupied, the second signal portion having a logic value indicativ of a transmitted data bit when the data bus is occupied and having said second logic value when the data bus is unoccupied and the third signal portion constantly having the second logic value, a station comprising:

receiver timing means for locally determining the time between successive transitions from said second logic value to said first logic value established in said data signal by another of said stations and the position and duration of said first, second and third part periods from said fixed ratio and the positions of said successive transitions from said second logic value to said first logic value;

detecting means for detecting the logic values of the first, second and third signal portions in the respective first, second and third part periods determined by the receiver timing means;

transmitter timing means for selectively establishing said successive transitions in said data signal from said second logic value to said first logic value; and transmitting means, responsive to the detecting means detecting a first signal portion having the second logic value indicative of the data bus being unoccupied, for transmitting on the data bus to establish in said data signal between said successive transitions from said second logic level to said first logic level a transition from said first logic level to said second logic level positioned such that the first and third signal portions respectively have said first and second logic values and said second signal portion has a logic value indicative of a transmitted data bit.

2. The station as claimed in claim 1, wherein said receiver timing means, said detecting means, said transmitter timing means and said transmitting means are comprised by a microprocessor which is controlled by a permanently entered program.

3. The station as claimed in claim 1, in which said data bus comprises a two-wire line and further comprising a power supply for said station connected to said two-wire line by way of a smoothing element whereby power is derived from said data signal on said bus.

4. The station of claim 1 wherein said detecting means and said receiver timing means comprise a clock pulse generator, and a counting device means including a first counter connected to the clock pulse generator for beginning to count from an initial first counter value, with clock pulses from said clock pulse generator, at a moment following an occurrence of said transition in said data signal from said second logic value to said first logic value after transferring a final first counter value said first counter means has reached at this moment into a memory, the counting device means further comprising means responsive to the position of the first counter means for:

on said first counter reaching a first counter position which is equal to a predetermined first fraction of the difference between said final and initial counter values which in accordance with said fixed ratio corresponds to a time within the first part period, generating a first sampling signal (S1) to a first sampling circuit responsive to the first sampling signal (S1), said first sampling circuit comprising means for generating a continuous local "bus occupied" signal for as long as said data signal has the first logic value simultaneously with each succeeding first sampling signal (S1);

on said first counter reaching a second counter position which is equal to a predetermined second fraction of the difference between the final and initial counter values which in accordance with said fixed ratio corresponds to a time within the second part period, generating a second sampling signal (S2), and when the local "bus occupied" signal is present, feeding said second sampling signal (S2) to a second sampling circuit which also receives said data signal, said second sampling circuit comprising means for generating at a data output of said second sampling circuit a data bit value indicative of the logic value which the data signal has simultaneously with said second sampling signal (S2).

5. The station as claimed in claim 4, wherein the first part period is divided into first and second sub-periods, said transmitter timing means establishing said successive transitions in said data signal from said second logic value to said first logic value by transmitting on the data bus a signal corresponding to the first logic value during said first sub-period, and said first sampling signal (S1) occurs at a time within said second sub-period.

6. The station as claimed in claims 4 or 5 in which said predetermined first and second fractions differ by an inverse power of two.

7. The station as claimed in claims 4 or 5, wherein the initial value of said first counter is zero, said first and second fractions are respectively ⅜ and ⅝ and in which said counting device means further comprises second, third and fourth counters interconnected with said first counter to form said memory means for at said moment causing setting said second counter to the final value of said first counter shifted by three binary places and said third and fourth counters to the final value of said first counter shifted by two binary places, and wherein said second, third, and fourth counters count down to a zero position with the clock signal of said clock pulse generator, whereby said second counter starts counting down at said moment and said third and fourth counters start counting down when the zero positions of the second and third counters, respectively, are reached, and the reaching of said zero position of said third counter generates said first sampling signal (S1) and the reaching of said zero position of said fourth counter generates said second sampling signal (S2).

8. The station as claimed in claims 4 or 5, in which said coutning device means further comprises:

a second counter which counts backwards with said clock signal of said clock pulse generator and is set to the final counter value of said first counter shifted by three binary places and each time a zero position of said second counter is reached, said coutning device means generates a counting pulse;

a third counter for counting with said counting pulses; and means responsive to the counting position of said third counter for generating in said first part period, said first sampling signal (S1) and said second sampling signal (S2).

9. In a communication network having a data bus via which a plurality of stations are connected in a manner that a data signal on the data bus has a first predetermined logic value if any of said stations transmit on the data bus the first logic value and has a second predetermined logic value, opposite said first logic value, if none of said stations transmit on the data bus the first logic value, a method for transmitting data bits from a station ready to transmit data to a station addressed by said data bits, in which successive timing periods are commenced by each transition in said data signal from said second logic value to said first logic value, each timing period having three part periods successive to one another and with durations in a fixed ratio to one another, said method comprising the following steps by the station ready to transmit data for each data bit to be transmitted:

detecting when said data bus has an unoccupied state by detecting when said data signal has the second logic value during a predetermined time period;

after said detecting, starting data transmission by:

first transmitting a signal on the data bus having the first logic value, indicating an occupied state of the bus, during the first part period of a said timing period;

second transmitting a signal on the data bus during the second part period of said timing period having the value of the data bit to be transmitted; and third transmitting a signal on the data bus having the second logic value during the third part period of said timing period; and the following steps by at least one other of said stations:

first determining the duration of said timing period and the position of said three part periods therein from said transitions in said data signal on the data bus occurring at the beginning of two successive ones of said timing periods;

second determining from the signal present on the data bus during the first part period whether the data bus has an unoccupied state or an occupied state; and third determining, when said data bus has an occupied state, the logic value of the transmitted data bit from the signal present on the data bus during the second part period.

10. The method as claimed in claim 9 further including the step by said station ready to transmit data in at least one preparatory timing period following said detecting and preceding said starting data transmission, of transmitting a signal on the data bus having the first logic value only during the first part period of the preparatory time period.

11. The method as claimed in claim 9, wherein said first part period is divided into first and second sub-periods and further including the step of transmitting by one of said stations of a signal on the data bus having the first logic value during the first sub-period in order to establish in said data signal said transitions from the second logic value to the first logic value, and wherein said detecting and first transmitting by the station ready to transmit data and said first determining by said at least one other station are during the second sub-period.

12. The method as claimed in claim 11, wherein said second and third part periods and the first and second sub-periods have equal time durations each of ¼ of said timing period.

13. The method as claimed in claim 11, wherein said steps of first determining and second determining are undertaken approximately in the middle of the second sub-period and second part period, respectively.

14. The method as claimed in claim 11, wherein the station ready to transmit sequentially repeats said first through third transmitting steps until a sufficient number of data bits have been transmitted to identify the station being addressed, and wherein following said transmission of said sufficient number of data bits, the station being addressed transmits a signal on the data bus having the first logic value during the second part period of at least one timing period while said station ready to transmit transmits a signal having the second logic value during said second part period of this period.

* * * * *